(12) United States Patent
O'Brien et al.

(10) Patent No.: US 8,443,276 B2
(45) Date of Patent: May 14, 2013

(54) SYSTEM AND DATA MODEL FOR SHARED VIEWING AND EDITING OF TIME-BASED MEDIA

(75) Inventors: Christopher J. O'Brien, Brooklyn, NY (US); Andrew Wason, Atlantic Highlands, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1057 days.

(21) Appl. No.: 12/294,583

(22) PCT Filed: Mar. 28, 2007

(86) PCT No.: PCT/US2007/065387
§ 371 (c)(1),
(2), (4) Date: Sep. 25, 2008

(87) PCT Pub. No.: WO2007/112445
PCT Pub. Date: Oct. 4, 2007

(65) Prior Publication Data
US 2009/0116812 A1    May 7, 2009

Related U.S. Application Data

(60) Provisional application No. 60/787,069, filed on Mar. 28, 2006, provisional application No. 60/787,105, filed on Mar. 28, 2006, provisional application No. 60/787,393, filed on Mar. 29, 2006, provisional application No. 60/746,193, filed on May 2, 2006, provisional application No. 60/822,925, filed on Aug. 18, 2006, provisional application No. 60/822,927, filed on Aug. 19, 2006.

(51) Int. Cl.
*G06F 17/00*    (2006.01)

(52) U.S. Cl.
USPC .......................................... 715/201; 715/255

(58) Field of Classification Search .......... 715/200–205, 715/210, 255, 700, 704, 716, 717, 719–720
See application file for complete search history.

(56) References Cited

U.S. PATENT DOCUMENTS

| | | | |
|---|---|---|---|
| 5,659,877 A | 8/1997 | Enomoto et al. | |
| 5,661,787 A | 8/1997 | Pocock | |
| 5,721,827 A | 2/1998 | Logan et al. | |
| 5,986,692 A | 11/1999 | Logan et al. | |
| 6,006,241 A | 12/1999 | Purnaveja et al. | |
| 6,075,576 A * | 6/2000 | Tan et al. | 348/425.4 |
| 6,314,425 B1 | 11/2001 | Serbinis et al. | |
| 6,795,499 B1 * | 9/2004 | Kato et al. | 375/240.01 |
| 6,839,059 B1 * | 1/2005 | Anderson et al. | 345/501 |
| 6,931,451 B1 | 8/2005 | Logan et al. | |
| 6,977,667 B1 | 12/2005 | Burke | |
| 7,055,166 B1 | 5/2006 | Logan et al. | |
| 7,065,709 B2 | 6/2006 | Ellis et al. | |
| 7,394,851 B2 * | 7/2008 | Kato et al. | 375/240.01 |

(Continued)

OTHER PUBLICATIONS

CT—PCT/US07/76339, Filed Aug. 20, 2007, International Search Report and Written Opinion, 7 pages, dated May 27, 2008.

(Continued)

*Primary Examiner* — Chau Nguyen

(57) ABSTRACT

The present invention provides a system and method for enabling shared viewing and editing of time-based media with improved speed by avoiding manipulation and re-manipulation of a stored underlying video data format through the use of metadata processes and cross-linked multi-level metadata processes and systems for operating with a decision list tracking device.

27 Claims, 2 Drawing Sheets

U.S. PATENT DOCUMENTS

| | | | |
|---|---|---|---|
| 2001/0047517 A1* | 11/2001 | Christopoulos et al. | 725/87 |
| 2002/0069218 A1 | 6/2002 | Sull et al. | |
| 2002/0165913 A1 | 11/2002 | Tokuda et al. | |
| 2003/0018609 A1* | 1/2003 | Phillips et al. | 707/1 |
| 2003/0028539 A1* | 2/2003 | Nunome et al. | 707/10 |
| 2003/0225641 A1 | 12/2003 | Gritzmacher et al. | |
| 2004/0019608 A1 | 1/2004 | Obrador et al. | |
| 2004/0220926 A1 | 11/2004 | Lamkin et al. | |
| 2005/0144305 A1 | 6/2005 | Fegan, II et al. | |
| 2005/0286546 A1 | 12/2005 | Bassoli et al. | |
| 2008/0080392 A1 | 4/2008 | Walsh et al. | |
| 2008/0092168 A1 | 4/2008 | Logan et al. | |
| 2008/0141180 A1 | 6/2008 | Reed et al. | |
| 2008/0141303 A1 | 6/2008 | Walker et al. | |

OTHER PUBLICATIONS

PCT—PCT/US07/65387, Filed Mar. 28, 2007, International Search Report and Written Opinion, 12 pages, dated Jul. 1, 2008.
PCT—PCT/US07/65534, filed Mar. 29, 2007, International Search Report and Written Opinion, 9 pages, dated Jul. 16, 2008.
PCT—PCT/US07/65391, filed Mar. 28, 2007, International Search Report and Written Opinion, 12 pages, dated Jul. 8, 2008.
PCT—PCT/US07/76342, filed Aug. 20, 2007, International Search Report and Written Opinion, 7 pages, dated Mar. 21, 2008.
PCT—PCT/US07/68042, filed May 2, 2007, International Search Report and Written Opinion, 9 pages, dated Sep. 11, 2008.

* cited by examiner

SYSTEM AND DATA MODEL FOR SHARED VIEWING AND EDITING OF TIME-BASED MEDIA

CROSS REFERENCE TO RELATED APPLICATIONS

This application relates to and claims priority from the following pending applications; PCT/US07/65387 filed Mar 28, 2007 which in turn claims priority from US Prov. App. No. 60/787,105 filed Mar 28, 2006, PCT/US07/65391 filed Mar 28, 2007 which in turn claims priority from US Prov. App. No. 60/787,069 filed Mar 28, 2006; PCT/US07/65534 filed Mar 29, 2007 which in turn claims priority from US Prov. App. No. 60/787,393 filed Mar 29, 2006, PCT/US07/76339 filed Aug 20, 2007 which in turn claims priority from US Prov. App. No. 60/822,925 filed Aug 18, 2006, PCT/US07/68042 filed May 2, 2007 which in turn claims priority from US Prov. App. No. 60/746,193 filed May 2, 2006, and PCT/US07/76342 filed Aug. 20, 2007, which in turn claims priority from US Prov. App. No. 60/822,927 filed August 19, 2006, the entire contents of each of which are fully incorporated herein by reference.

FIGURE SELECTED FOR PUBLICATION

FIG. 2

BACKGROUND OF THE INVENTION

1. Field of the Invention

The present invention relates to a system, method, and data model enabling a number of improved operations involving time-based media. These improvements relate to enhanced uploading, storing, shared viewing, editing, manipulation, and operations involving time-based media. More specifically, the present invention relates to a data model of operational parameters for operating a comprehensive data system for shared networked video, audio, animated graphics and other time-based media.

2. Description of the Related Art

Consumers are shooting more and more personal video using camera phones, webcams, digital cameras, camcorders and other devices, but consumers are typically not skilled videographers nor are they able or willing to learn complex, traditional video editing and processing tools like Apple iMovie or Windows Movie Maker. Nor are most users willing to watch most video "VCR-style", which is in a steady steam of unedited, undirected, unlabeled video.

Thus consumers are being faced with a problem that will be exacerbated as both the number of videos shot and the length of those videos grows (supported by increased processing speeds, memory and bandwidth in end-user devices such as cell phones and digital cameras) while the usability of editing tools lags behind The result will be more and longer video files whose usability will continue to be limited by the inability to locate and access granular segments of interest within the larger videos in an overall library of videos.

Those skilled in the art should recognize the more generic terminology "time-based media" which encompasses not only video with synchronized audio but also audio alone plus also a range of animated graphical media forms ranging from sequences of still images to what is commonly called 'cartoons'. All of these forms are addressed herein. The terms video, time-based media, and digitally encoded video with synchronized audio (DEVSA) are used as terms of convenience within this application with the intention to encompass examples of time-based media.

A further detriment to the consumer is that video processing uses a lot of computer power and special hardware often not found on personal computers. Video processing also requires careful hardware and software configuration by the consumer. Consumers need ways to edit video without having to learn new skills, buy new software or hardware, become expert systems administrators or dedicate their computers to video processing for great lengths of time.

Consumers have been limited to editing and sharing video that they could actually get onto their computers, which requires the right kind of hardware to handle their own video, and also requires physical movement of media and encoding if they wish to use video shot by another person or which is taken from stock libraries.

When coupled with the special complexities of digitally encoded video with synchronized audio, the requirement for special hardware, difficult processing and storage demands combine to reverse the common notion of using "free desktop MIPS and GBs" to relieve central servers. Unfortunately, for video review and editing the desktop is just is not enough for most users. The cell phone is certainly not enough, nor is the Personal Digital Assistant (PDA). There is, therefore, a need for an improved method and system for shared viewing and editing of time-based media.

Those with skill in the conventional arts will readily understand that the terms "video" and "time-based media" as used herein are terms of convenience and should be interpreted generally below to mean DEVSA including content in which the original content is graphical.

This application addresses a unique consumer and data model and other systems that involve manipulation of time-based media. As introduced above, those of skill in the art reviewing this application will understand that the detailed discussion below addresses novel methods of receiving, managing, storing, manipulating, and delivering, digitally encoded video with synchronized audio. (Conveniently referred to as "digitally encoded video with synchronized audio" (DEVSA) and more broadly time-based media).

In order to understand the concepts provided by the present, and related inventions, those of skill in the art should understand that DEVSA data is fundamentally distinct from and much more complex than data of those types more commonly known to the public and the broad data processing community and which is conventionally processed by computers such as basic text, numbers, or even photographs, and as a result requires novel techniques and solutions to achieve commercially viable goals (as will be discussed more fully below).

Techniques (editing, revising, compaction, etc.) previously applied to these other forms of data types cannot be reasonably extended due to the complexity of the DEVSA data, and if commonly known forceful extensions are orchestrated they would:

Be ineffective in meeting users' objectives and/or

Be economically infeasible for non-professional users and/or

Make the so-rendered DEVSA data effectively inoperable in a commercially realistic manner.

Therefore a person skilled in the art of text or photo processing cannot easily extend the techniques that person knows to DEVSA.

What is proposed for the present invention is a new system and method for managing, storing, manipulating, editing, operating with and delivering, etc. DEVSA data. As will be discussed herein the demonstrated state-of-the-art in DEVSA processing suffers from a variety of existing, fundamental detriments associated with known DEVSA data operations. The differences between DEVSA and other data types and the consequences thereof are discussed in the following paragraphs.

This application does not specifically address new techniques for digitally encoding video and/or audio or for decoding DEVSA. There is substantive related art in this area that can provide a basic understanding of the same and those of skill in the electronic arts know these references. Those of skill in the art will understand however that more efficient encoding/decoding to save storage space and to reduce transmission costs only serves to greatly exacerbate the problems of operating on DEVSA and having to re-save revised DEVSA data at each step of an operation.

A distinguishing point about video and, by extension stored DEVSA, is to emphasize that video or stored DEVSA represents an object with four dimensions: X, Y, A-audio, and T-time, whereas photos can be said to have only two dimensions (X, Y) and can be thought of as a single object that has two spatial dimensions but no time dimension. The difficulty in dealing with mere two dimensional photo technology is therefore so fundamentally different as to have no bearing on the present discussion (even more lacking are text art solutions).

Another distinguishing point about stored DEVSA that illustrates its unique difficulty in editing operations is that it extends through time. For example, synchronized (time-based) comments are not easily addressed or edited by subsequent users.

Those with skill in the art should be aware of an obvious example of the detriments presented by this time dependence in that it is common for Internet users to post comments on Web sites about specific news items, text messages, photos or other objects which appear on Web sites. The techniques for doing so are well known to those with skill in the art and are commonly used today. The techniques are straightforward in that the comment is a fixed, single data object and the object commented upon is a fixed, single data object. However the corollaries in the realm of time-based media are not well known and not supported within the current art.

As an illustrative example, consider the fact that a video may extend for five minutes and encompass 7 distinct scenes addressing 7 distinct subjects. If an individual wishes to comment upon scene 5/subject 5, that comment would make no sense if it were tied to the video as a whole. It must be tied only to scene 5 that happens to occur from 3 minutes 22 seconds until 4 minutes 2 seconds into the video.

Since the video is a time-based data object, the comment must also become a time-based data object and be linked within the time space of the specific video to the segment in question. Such time-based comments and such time-dependent linkages are not known or supported within the related arts but are supported within this model.

A stored DEVSA represents an object with four dimensions: X, Y, A, T: large numbers of pixels arranged in a fixed X-Y plane which vary smoothly with T (time) plus A (audio amplitude over time) which also varies smoothly in time in synchrony with the video. For convenience this is often described as a sequence of "frames" (such as 24 frames per second). This is however a fundamentally arbitrary choice (number of "frames" and use of "frame" language) and is a settable parameter at encoding time. In reality the time variance of the pixel's change with time is limited only by the speed of the semiconductors that sense the light.

Before going further it is also important for those of skill in the art to understand the scale of these DEVSA data elements that sets them apart from other text or photo data elements. As a first example, a 10-minute video at 24 "frames" per second would contain 14,400 frames. At 600×800 pixel resolution, 480,000 pixels, one approaches 7 billion pixel representations.

When one adds in the fact that each pixel needs 10- to 20 bits to describe it and the need to simultaneously describe the audio track, there is a clear and an impressive need for an invention that addresses both the complexity of the data and the fact that the DEVSA represents not a fixed, single object but rather a continuous stream of varying objects spread over time whose characteristics can change multiple times within a single video. To date no viable solutions have been provided which are accessible to the typical consumer, other than very basic functions such as storing pre-encoded video files and manipulating these as fixed files.

While one might have imagined that photos and video offer similar technical challenges, the preceding discussion makes it clear again that the detriments in dealing with mere two dimensional photos which are fixed in time are therefore so fundamentally different and less challenging as to have no bearing on the present discussion.

Some additional facts about DEVSA should be well understood by those of skill in the art; and these include:
  a. Current decoding technology allows one to select any instant in time within a video and resolve a "snapshot" of that instant, in effect rendering a photo of that instant and to save that rendering in a separate file. As has been shown, for example in surveillance applications, this is a highly valuable adjunctive technology but it completely fails to address the present needs.
  b. It is not possible to take a "snapshot" of audio as it is perceived by a person. Those of skill in the electronic and audio-electronic arts recognize that audio data is a one dimensional data type: (amplitude versus time). It is only as amplitude changes with time that it is perceivable by a person. Electronic equipment can measure that amplitude if desired for special reasons.

The present application, and those related family applications apply to this understanding of DEVSA when the actual video and audio is compressed (as an illustration only) by factors of a thousand or more but remains nonetheless very large files. Due the complex encoding and encodation techniques employed, those files cannot be disrupted or manipulated without a severe risk to the inherent stability of the underlying video and audio content.

The conventional manner in which users edit digitized data, whether numbers, text, graphics, photos, or DEVSA, is to display that data in viewable form, make desired changes to that viewable data directly and then re-save the now-changed data in digitized form.

The phrase above, "make desired changes to that viewable data", could also be stated as "make desired changes to the manner in which that data is viewed" because what a user "views" changes because the data changes, which is the normative modality. In contrast to this position, the proposed invention changes the viewing of the data without changing the data itself. The distinction is material and fundamental.

In conventional data changes, where storage cost is not an issue to the user, the user can choose to save both the original and the changed version. Some sophisticated commercial software for text and number manipulation can remember a limited number of user-changes and, if requested, display and, if further requested, may undo prior changes.

This latter approach is much less feasible for photos than for text or numbers due to the large size and the extensive encoding required of photo files. It is additionally far less feasible for DEVSA than for photos because the DEVSA files are much larger and because the DEVSA encoding is much more complex and processor intensive than that for photo encoding alone.

In a similar analysis, the processing and storage costs associated with saving multiple old versions of number or text documents is a small burden for a typical current user. However, processing and storing multiple old versions of photos is a substantial burden for typical consumer users today. Most often, consumer users store only single compressed versions of their photos. Ultimately, processing and storing multiple versions of DEVSA is simply not feasible for any but the most sophisticated users even assuming that they have use of suitable editing tools.

As will be discussed, this application proposes new methodologies and systems that address the tremendous conventional challenges of editing heavily encoded digitized media such as DEVSA.

In a parallel problem, known to those with skill in the conventional arts associated with heavily encoded digitized media such as DEVSA, is searching for content by various criteria within large collections of such DEVSA.

Simple examples of searching digitized data include searching through all of one's accumulated emails for the text word "Anthony". Means to accomplish such a search are conventionally known and straight-forward because text is not heavily encoded and is stored linearly. On the Internet, companies like Google and Yahoo and many others have developed and used a variety of methods to search out such text-based terms (for example "Washington's Monument"). Similarly, number-processing programs follow a related approach in finding instances of a desired number (for example the number "$1,234.56").

However, when the conventional arts approach digitally encoded graphics or, more challengingly, digitally encoded photos, and even more challengingly, DEVSA, managing problem becomes severe because the object of the search becomes less and less well-defined in terms, (1) a human can explain to a computer, and (2) a computer can understand and use algorithmically. Moreover, the data is ever more deeply encoded as one goes from graphics to photos to DEVSA.

Conventional efforts to employ image recognition techniques for photos and video, and speech recognition techniques for audio and video/audio, require that the digitized date be decoded back to viewable/audible form prior to application such techniques. As will be discussed later, repetitive encoding/decoding with edits introduces substantial risks for graphical, photographic, audio and video data.

As an example of this search challenge, consider the superficially simple graphics search question: "Search the file 'XYZ graph' which includes 75 figures and find all the elements which are "ovals".

If the search is being done with the same software, which created the original file, the search may be possible. However, if the all the user has are images of the figures, the challenges are substantial. To name a few:

1. The user and the computer first have to agree on what "oval" means. Consider the fact that circles are "ovals" with equal major and minor axes.
2. The user and computer have to agree if embedded figures such as pictures or drawings of a dog should be included in the search since the dog's eyes may be "oval".
3. The user and computer have to agree if "zeros" and/or "O's" are ovals or just text.

The point is that recognizing shapes gets tricky.

Turning to photos, unless there are metadata names or tags tied to the photo, which explain the content of the photo, determining the content of the photo in a manner susceptible to search is a largely unsolved problem outside of very specialized fields such as police ID photos. Distinguishing a photo of Mt. Hood from one of Mt. Washington by image recognition is extremely difficult.

This application proposes new methods, systems, and techniques to enable and enhance use, editing and searching of DEVSA files via use of novel types of metadata and novel types of user interactions with integrated systems and software. Specifically related to the distinction made above, this application addresses methods, systems and operational networks that provide the ability to change the manner in which users view digitized data, specifically DEVSA without necessarily changing the underlying digitized data.

Those of skill in the art will recognize that there has been a tremendous commercial and research demand to cure the long-felt-problem of data loss where manipulating the underlying DEVSA data in situ. Repetitive encoding and decoding cycles are very likely to introduce accumulating errors with resultant degradation to the quality of the video and audio. Therefore there is strong demand to retain copies of original files in addition to re-encoded files. Since, as stated previously, these are large files even after efficient encoding, economic pressures make it very difficult to keep many copies of the same original videos.

Thus, the related art in video editing and manipulation favors light repetitive encoding which in turn uses lots of storage but requires keeping more and more copies of successive versions of the encoded data to avoid degradation thus requiring even more storage. As a consequence, those of skill in the art will recognize a need to overcome the particular detriments presented by the current solutions to manipulation of time-based media.

As an illustrative example only, those of skill in the art should recognize the below comparison between DEVSA and other somewhat related data types.

The most common data type on computers (originally) was or involved numbers. This problem was well solved in the 1950s on computers and as a material example of this success one can buy a nice calculator today for $9.95 at a local non-specialty store. As another example, both Lotus® and now Excel® software systems now solve most data display problems on the desktop as far as numbers are concerned.

Today the most common data type on computers is text. Text is a one-dimensional array of data: a sequence of characters. That is, the characters have an X component (no Y or other component). All that matters is their sequence. The way in which the characters are displayed is the choice of the user. It could be on an 8×10 inch page, on a scroll, on a ticker-tape, in a circle or a spiral. The format, font type, font size, margins, etc. are all functions added after the fact easily because the text data type has only one dimension and places only one single logical demand on the programmer, that is, to keep the characters in the correct sequence.

More recently a somewhat more complex data type has become popular, photos or images. Photos have two dimensions: X and Y. A photo has a set of pixels arranged in a fixed X-Y plane and the relationship among those pixels does not change. Thus, those of skill in the art will recognize that the photo can be treated as a single object, fixed in time and manipulated accordingly.

While techniques have been developed to allow one to "edit" photos by cropping, brightening, changing tone, etc., those techniques require one to make a new data object, a new "photo" (a newly saved image), in order to store and/or retrieve this changed image. This changed image retains the same restrictions as the original: if one user wants to "edit"

the image, the user needs to change the image and re-save it. It turns out that there is little "size", "space", or "time" penalty to that approach to photos because, compared to DEVSA, images are relatively small and fixed data objects.

In summary, DEVSA should be understood as a type of data with very different characteristics from data representing numbers, text, photos or other commonly found data types. Recognizing these differences and their impacts is fundamental to the proposed invention. As a consequence, an extension of ideas and techniques that have been applied to those other, substantially less complex data types have no corollary to those conceptions and solutions noted below. The present invention provides a new manner of (and a new solution for) dealing with DEVSA type data that both overcomes the detriments of such data noted above and results in a substantial improvement demonstrated via the present system and method.

The present invention also recognizes the earlier-discussed need for a system or method to manage DEVSA data while providing extremely rapid response to user input without changing the underlying DEVSA data.

What is also needed is a new manner of dealing with DEVSA that overcomes the detriments inherent in such data and that enables immediate and timely response to both initial DEVSA data, and especially that DEVSA data and time-based media in general that is amended-or-updated on a continual or rapidly changing basis.

What is not appreciated by the related art is the fundamental data problem involving DEVSA and current systems for manipulating the same in a consumer responsive manner.

What is also not appreciated by the related art is the need for providing a data model that accommodates (effectively) all present modern needs involving high speed and high volume video data manipulation.

Accordingly, there is a need for an improved system and data model for shared viewing and editing of time-based media.

SUMMARY OF THE INVENTION

The present invention proposes a response to the detriments noted above.

It is another proposal of the present invention to provide an improved video operation system with improved user-interaction over the Internet and other data networks.

Another proposal of the present invention is that videos and associated data linked with the video content may be made available to viewers across multiple types of electronic devices and who are linked via data networks of variable quality and speed, wherein, depending on the needs of that user and that device and the qualities of the network, the video may be delivered as a real-time stream or downloaded in encoded form to the device to be played back on the device at a later time.

Another proposal of the present invention is to accomplish all of these and other capabilities in a manner that provides for efficient and cost-effective information systems design and management.

Another proposal of the present invention is to provide an improved system and data model for shared viewing and editing of a time-based media that has been encoded in a standard and recognized manner and optionally may be encoded in more than one manner.

Another object of the present invention is to provide a system, data model, and architecture that enables comments synchronized with DEVSA as it extends through time.

What is additionally proposed for the present invention is a new way for managing, storing, manipulating, operating with and delivering, etc. DEVSA data stored in a recognized manner using playback decision tracking, that is tracking the decisions of users of the manner in which they wish the videos to be played back which may take the form of Playback Decision Lists (PDLs) which are time-dependent metadata co-linked to particular DEVSA data.

Another proposal of the present invention is to provide a data system and operational model that enables generation and tracking of multiple and independent (hierarchical) layers of time-dependent metadata that are stored in a manner linked with video data that affect the way the video is played back to a user at a specific time and place without changing the underlying stored DEVSA.

It is another proposal of the present invention to provide a system, method, and operational model that tracks via time-dependent metadata (via playback decision track or PDLs) individual user preferences on how to view video.

Another proposal of the present invention is to enable a system for tagging video data to identify a specific user, in a specific hierarchy, in a specific modality (soccer, kids, fun, location, family, etc) while enabling a sharable or defined group interaction.

Another proposal of the present invention is to enable a operative system that determines playback decision lists (PDLs) and enables their operation both in real-time on-line viewing of DEVSA data and also enables sending the PDL logic to an end user device for execution on that local device, when the DEVSA is stored on or delivered to that end-user device, to minimize the total bit transfer at each viewing event thereby further minimizing response time and data transfer.

The present invention relates to a novel system and data model for uploading, managing, shared viewing and editing of time-based media with improved speed by avoiding manipulation and re-manipulation of a stored underlying video data format through the use of metadata processes and cross-linked multi-level metadata processes and systems for operating with a decision list tracking device.

The above and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
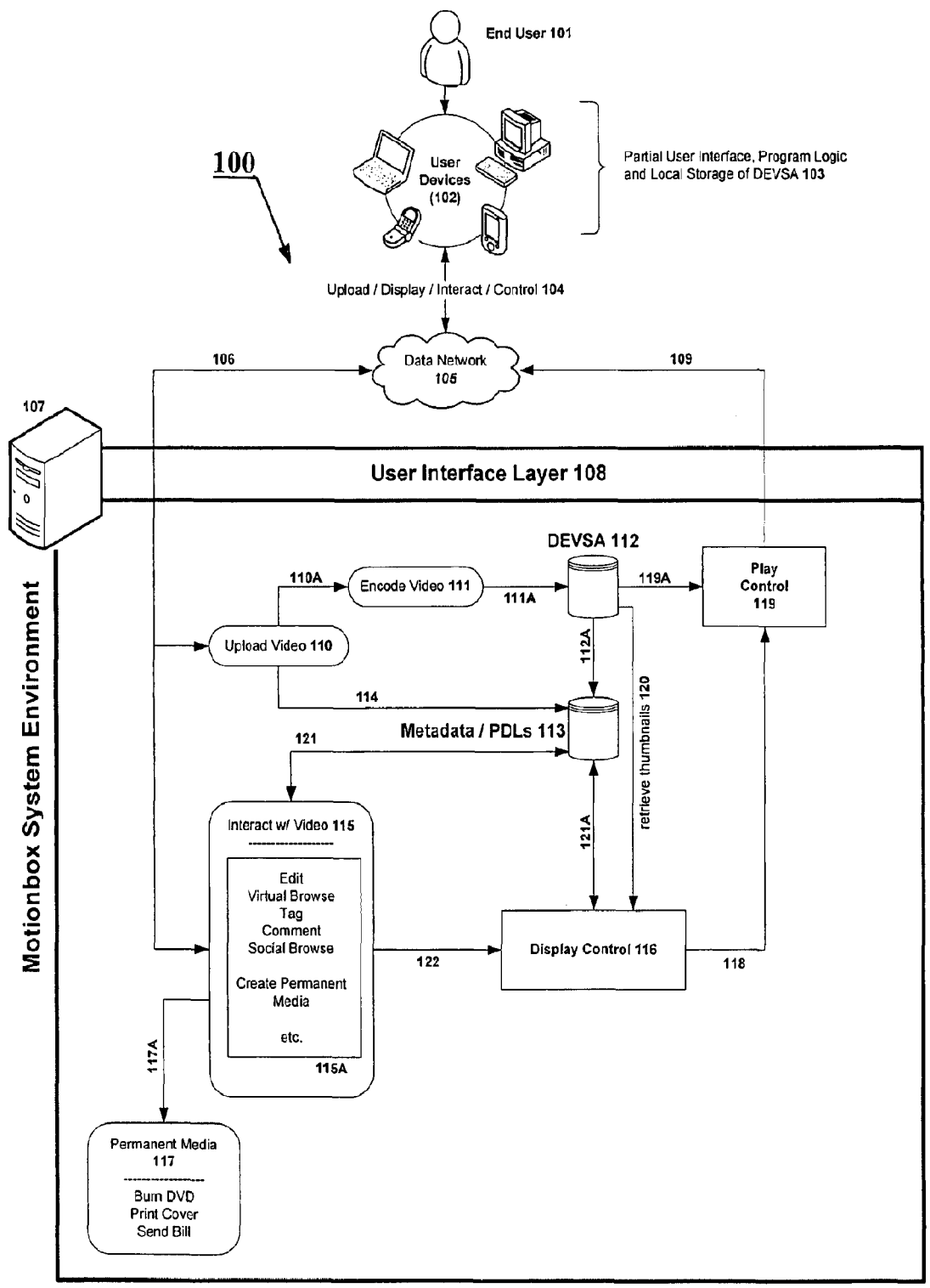
FIG. 1 represents an illustrative flow diagram for an operational system and architectural model for one aspect of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Before going further, and in order to fully appreciate the major innovation described in this and the related applications, it is necessary to introduce a new enabling concept which is referred to as the Playback Decision List or hereafter "PDL." The PDL is a portion of metadata contained within a data model or operational system for manipulating related video data and for driving, for example, a flash player to play video data in a particular way without requiring a change in the underlying video data (DEVSA). This new concept of a PDL is best understood by considering its predecessor concepts that originated years ago in film production and are used today by expert film and video directors and editors.

The predecessor concept is an Edit Decision List or EDL. It is best described with reference to the production of motion picture. In such a production many scenes are filmed, often several times each, in a sequence that has no necessary relationship to the story line of the movie. Similarly, background music, special effects, and other add-ons are produced and recorded or filmed independently. Each of those film and audio elements is carefully labeled and timed with master lists.

When these master lists are complete, the film's director and editor sit down, often for a period of months, and review each element while gradually writing down and creating and revising an EDL which is a very detailed list, second by second, of which film sequences will be spliced together in what sequence perhaps with audio added to make up the entire film. Additionally, each sequence may have internal edits required such as fade-in/out, zoom-in/out, brighten, raise audio level and so on. The end result is an EDL. Technicians use the EDL to, literally in the case of motion picture to cut and paste together the final product. Some clips are just cut and "left on the cutting room floor." Expert production of commercial video follows a very similar approach.

The fundamental point of an EDL is that one takes segments of film or video and audio and possibly other elements and links them together to create a new stream of film or video, audio, etc. The combining is done at the film or video level, often physically. The original elements very likely were cut, edited, cropped, faded in/out, or changed in some other manner and may no longer even exist in their original form.

This EDL technique has proven to be extremely effective in producing high quality film and video. It requires a substantial commitment of human effort, typically many staff hours per hour of final media and is immensely costly. It further requires that the media elements to be edited be kept in viewable/hearable form in order to be edited properly. Such an approach is economically impossible when dealing with large quantities of consumer produced video. The PDL concept introduced herein provides a fundamentally different way to obtain a similar end result. The final "quality" of the video will depend on the skill and talent of the editor nonetheless.

The PDL incorporates as metadata associated with the DEVSA all the edit commands, tags, commentary, permissions, etc. introduced by a user via a User Interface (as will be discussed). It is critical to recognize that multiple users may introduce edit commands, tags, commentary, permissions, etc. all related to the same DEVSA without changing the underlying video data. The User Interface and the structure of the PDL allow a single PDL to retrieve data from multiple DEVSA.

The result is that a user can define, for example, what is displayed as a series of clips from multiple original videos strung together into a "new" video without ever changing the original videos or creating a new DEVSA file. Since multiple users can create PDLs against the same DEVSA files, the same body of original videos can be displayed in many different ways without the need to create new DEVSA files. These "new" videos can be played from a single or from multiple DEVSA files to a variety of end-user devices through the use of software and/or hardware decoders that are commercially available. For performance or economic reasons, copies or transcodings of certain DEVSA files may be created or new DEVSA files may be rendered from an edited segment, to better serve specific end-user devices without changing the design or implementation of the invention in a significant manner.

Since multiple types of playback mechanisms are likely to be needed such as one for PCs, one for cell phones and so on, the Programming Model will create a "master PDL" from which algorithms can create multiple variations of the PDL suitable for each of the variety of playback mechanisms as needed. The PDL executes as a set of instructions to the video player.

As discussed earlier, in certain cases it is advantageous to download an encoded file in a form suitable to a specific device type rather than stream a display in real time. In the "download" case, the system will create the file using the PDL and the DEVSA, re-encode it in the appropriate format, and then send that encoded file to the end-user device where it is stored until the user chooses to play it. This "download" case is primarily a change in the mode of delivery rather a fundamentally distinct methodology.

The crucial innovation introduced by PDL is that it controls the way the DEVSA is played to any specific user at any specific time. It is a control list for the DEVSA player (flash player/video player). All commands (edits, sequences, tags, comments, permissions, etc.) are executed at playback time while the underlying DEVSA does not change. This makes the PDL in stark contrast to an EDL which is a set of instructions to create a new DEVSA out of previously existing elements.

While the following detail will be discussed more fully in related applications the discussion below illustrates that the present proposal consists of (at least) three major, linked components, all driven from the central servers (a) one or more User Interfaces; (b) an underlying Programming Model and algorithms (operational programs) for enabling suitable operation (as will be described); and (c) A Data Model for enabling operability and data manipulation.

All actual video manipulation is done on the server but embodiments are envisioned that are solely provided by user software on a user editing computer without internet/web access. The "desktop" or other user interface device needs to operate Web browser software or the equivalent, a video & audio player which can meet the server's requirements and its own internal display and operating software and be linked to the servers via the Internet or another suitable data connection. As advances in consumer electronics permit, other implementations become feasible. In those alternative implementations certain functions can migrate from the servers to end user devices or to network-based devices without changing the basic design or intent of the invention.

An important component of a successful video editing system is a flexible user interface that is consistent with typical user experience, but not necessarily typical video editing user interfaces, and: (a) will not place undue burdens on the end user's device, and (b) is truly linked to the actual DEVSA.

A major detriment to be overcome is that the DEVSA is a four dimensional entity which needs to be represented on a two dimensional display, a computer screen or the display of a handheld device such as a cell phone or an iPod®.

As will be discussed more fully in reference to FIG. 1 and FIG. 2 below, the present discussion represents the approach of creating an analog of a text document made up, not of a sequence of text characters, but instead of a sequence of "thumbnail" frame images at selected times throughout the video.

A useful point is to have the thumbnails and the "flow" of the video follow a sequence similar to that of the user's written language; such as, left-to-right, top-to-bottom, or right-to-left. A selected frame may be enlarged and shown above the rows for easier viewing (and hence manipulation and commenting via editing or social browsing routines, etc) by the user.

A representative example only and as part of the continued background discussion; a 5 minute video might be initially displayed as 15 thumbnail images spaced about 20 seconds apart in time through the video. This user interface allows the user to quickly grasp the overall structure of the video and manipulate selected images via PDL details discussed herein. The choice of 15 images rather than some higher or lower number is initially set by the server administrator but when desired by the user can be largely controlled by the user as he/she is comfortable with the screen resolution and size of the thumbnail image.

As will be discussed more fully elsewhere, and as continued background; the user can "zoom in" on sub-sections of the video and thus expand to, for example, 15 thumbnails covering 1 minute of video so that the thumbnails are only separated by about 4 seconds. Whenever desired, the user can "zoom-in" or "zoom-out" to adjust the time scale to meet the user's current editing or viewing needs. One approach is the so-called "slider" wherein the user highlights a selected portion of the video timeline causing that portion to be expanded (zoomed-in) causing additional, more closely placed thumbnails of just that portion to be displayed. Additionally, other view modes can be provided, for example the ability to see the created virtual clip in frame (as described herein), clip (where each segment is shown as a single unit), or traditional video editing time based views.

The user interfaces allow drag and drop editing of different video clips with a level of ease similar to that of using a word processing application such as Microsoft Word®, but entirely within a web browser. The user can remove unwanted sections of video or insert sections from other videos in a manner analogous to the cut/copy-and-paste actions done in text documents.

A noted previously, these "drag, drop, copy, cut, paste" edit commands are stored within the Data Model as metadata, do not change the underlying DEVSA data, and are therefore in clear contrast with the related art.

The edit commands, tags and commentary can all be externally time-dependent at the user's option. As an elementary example, "If this is played between March 29 and March 31, Play Audio: "HAPPY BIRTHDAY". Ultimately, all PDL may be externally time dependent if desired.

Other user interface representations of video streams on a two dimensional screen are also possible and could also be used without disrupting the editing capabilities described herein. One example is to arrange the page of thumbnail images in time sequence as if they were a deck of cards or a book thus creating an apparent three-dimensional object where the depth into the "deck of cards" the "book" is a measure of time. Graphical "tabs" could appear on the cards or book pages (as on large dictionaries) that would identify the time (or other information) at that depth into the deck or book. The user could then "cut the deck" or "open the book" at places of his choosing and proceed in much the same way as described above. These somewhat different representations would not change the basic nature of the claims herein. There can be value in combining multiple such representations to aid users with diverse perception preferences or to deal with large quantities of information.

In the preceding it has been assumed that the "user" has the legal right to modify the display of the DEVSA, which may be arguably distinguished from a right to modify the DEVSA itself. There may be cases where there are users with more limited rights. The User Interface will allow the individual who introduces the video and claims full edit rights, subject to legal review, to limit or not to limit the rights of others to various viewing permissions and so-called "editing" functions (these are "modifying the display" edits noted earlier). These permissions can be adjusted within various sub-segments of the video. It is expected that the addition of tags and commentary by others will not generally be restricted in light of the fact that the underlying DEVSA is not compromised by these edit commands as is explained more fully below Having completed the overall supporting discussion, reference is now made to FIG. 1, an architectural review of a system model 100 for improving manipulation and operations of video and time-based DEVSA data. It should be understood, that the term "video" is sometimes used below as a term of convenience and should be interpreted to mean DEVSA and more broadly as time-based media.

In viewing the technological architecture of system model 100, those of skill in the art will recognize that an end user 101 may employ a range of known user device types 102 (such as PCs, cell phones, PDAs, iPods, DVRs et al.) or combinations thereof to create and view DEVSA/video data. Diverse user device types can be used for distinct functions within the overall process described herein without constraint so long as the devices have the required functionality. For example, video may be captured on a camcorder, transferred to a PC from which it is uploaded to a Web site and then later viewed on a DVR or DVD player.

Devices 102 include a plurality of user interfaces, operational controls, video management requirements, programming logic, local data storage for diverse DEVSA formats, all represented via capabilities 103.

Capabilities 103 enable a user of a device 102 to perform multiple interaction activities 104 relative to a data network 105. These activities 104 are dependent upon the capacities 103 of devices 102, as well as the type of data network 105 (wireless, dial, DSL, secure, non-secure, etc.).

Activities 104 including upload, display, interact, control, etc. of video, audio and other data via some form of data network 105 suited to the user device in a manner known to those of skill in the art. The user's device 102, depending on the capabilities and interactions with the other components of the overall architecture system 100, will provide 103 portions of the user interface, program logic and local data storage.

Other functions are performed within the system environment represented at 107 which typically will operate on servers at central locations while allowing for certain functionality to be distributed through data network 105 as technology allows and performance and economy suggest without changing the architecture and processes as described herein.

All interactions between system environment 107 and users 101 pass through a user interface layer 108 which provides functionality commonly found on Internet or cell phone host sites such as security, interaction with Web browsers, messaging etc. and analogous functions for other end user devices.

As discussed, the present system 100 enables user 101 to perform many functions, including uploading video/DEVSA, audio and other information from his end user device 102 via data network 105 into system environment 107 via a first data path 106.

First data path 106 enables an upload or DEVSA/video via program logic upload process loop 110. Upload process loop 110 manages the uploading process, which can take a range of forms.

For example, in uploading video/DEVSA from a cell phone, the upload process 110 can be via emailing a file via interactions 104 and data network 105. In a second example, for video captured by a video camera, the video may be transferred from the camera to the user's PC (both user devices 102) and then uploaded from the PC to system environment 107 web site via the Internet in real time or as a background process or as a file transfer. Physical transmission of media is also possible.

During system operation, after a successful upload via uploading process loop 110, each video is associated with a particular user 101 and assigned a unique user and upload and video identifier, and passed via pathway 110A to an encode video process system 111 where it is encoded into one or more standard forms as determined by the system administrators or in response to a user request. The encoded video/DEVSA then passes via conduit 111A to storage in the DEVSA storage files 112. At this time, the uploaded, encoded and stored DEVSA data can be manipulated for additional and different display (as will be discussed), without underlying change. As will be more fully discussed below, the present data system 100 may display DEVSA in multiple ways employing a unique player decision list (PDL) for tracking edit commands as metadata without having to re-save, and re-revise, and otherwise modify the initially saved DEVSA.

Additionally, and as can be viewed from FIG. 1, during the upload (105-106-110), encodation (110A-111), and storage (111A-112) processes stages of system 100; a variety of "metadata" is created about the DEVSA including user ID, video ID, timing information, encoding information including the number and types of encodings, access information, and many other types of metadata, all of which passes via communication paths 114 and 112A to the Metadata/PDL storage facility(ies) 113. There may be more than one Metadata/PDL storage facility. As will be later discussed, the PDL drives the software controller for the video player on the user device via display control 116/play control 119 (as will be discussed).

Such metadata will be used repeatedly and in a variety of combinations with other information to manage and display the DEVSA combined with the metadata and other information to meet a range of user requirements. The present system also envisions a controlled capacity to re-encode a revised DEVSA video data set without departing from the scope and spirit of the present invention.

It is expected that many users and others including system administrators will upload (over time) many DEVSA to system environment 107 so that a large library of DEVSA (stored in storage 112) and associated metadata (stored in storage 113) will be created by the process described above.

Following the same data path 106 users can employ a variety of functions generally noted by interaction with video module 115. Several types of functionalities 115A are identified as examples within interact with video module 115; including Editing, Virtual Browsing, Commenting, Social Browsing, etc. These functions include the user-controlled design and production of permanent DEVSA media such as DVDs and associated printing and billing actions 117 via a direct data pathway 117A, as noted. It should be noted that there is a direct data path between the DEVSA files 112 and the functions in 117 (not shown in the Figure for reasons of readability.)

Many of the other functions 115A are targeted at online and interactive display of video and other information via data networks. The functions 115 interact with users via communication path 106; and it should be recognized that functions 115A use, create, and store metadata 113 via path 121.

User displays are generated by the functions 115/115A via path 122 to a display control 116 that merges additional metadata via path 121A, thumbnails (still images derived from videos) from 112 via paths 120.

Thumbnail images are created during encoding process 111 and optionally as real time process acting on the DEVSA without modifying the DEVSA triggered by one of the functions 115/115A (play, edit, comment, etc.) or by some other process.

Logically the thumbnails are part of the DEVSA, not part of the metadata, but they may be alternatively and adaptively stored as part of metadata in 113. An output of display control 116 passes via pathway 118 to play control 119 that merges the actual DEVSA from storage 112 via pathway 119A and sends the information to the data network 105 via pathway 109.

Since various end user devices 102 have distinct requirements, multiple Play Control modules may easily be implemented in parallel to serve distinct device types. It is also envisioned, that Distinct Play Control modules 119 may merge distinct DEVSA files of the same original video and audio with different encoding via 119A depending on the type of device being supported.

It is important to note that interactive functions 115/115A do not link directly to the DEVSA files stored at 112, only to the metadata/PDL files stored at 113. The display control function 116 links to the DEVSA files 112 only to retrieve still images. A major purpose of this architecture within system 100, is that the DEVSA, once encoded, is preferably not manipulated or changed—thereby avoiding the earlier noted concerns are applied at the time of Play Control and re-saving. All interactive capabilities are applied at the time of Play Control 119 as a read-only process on the DEVSA and transmitted back to user 110 via pathway 109.

Those with skill in the art should recognize that PDLs and other metadata as discussed herein can apply not only to real time playback of videos and other time-based media but also to the non-real-time playback of such media such as might be employed in the creation of permanent media such as DVDs.

Figure 2:
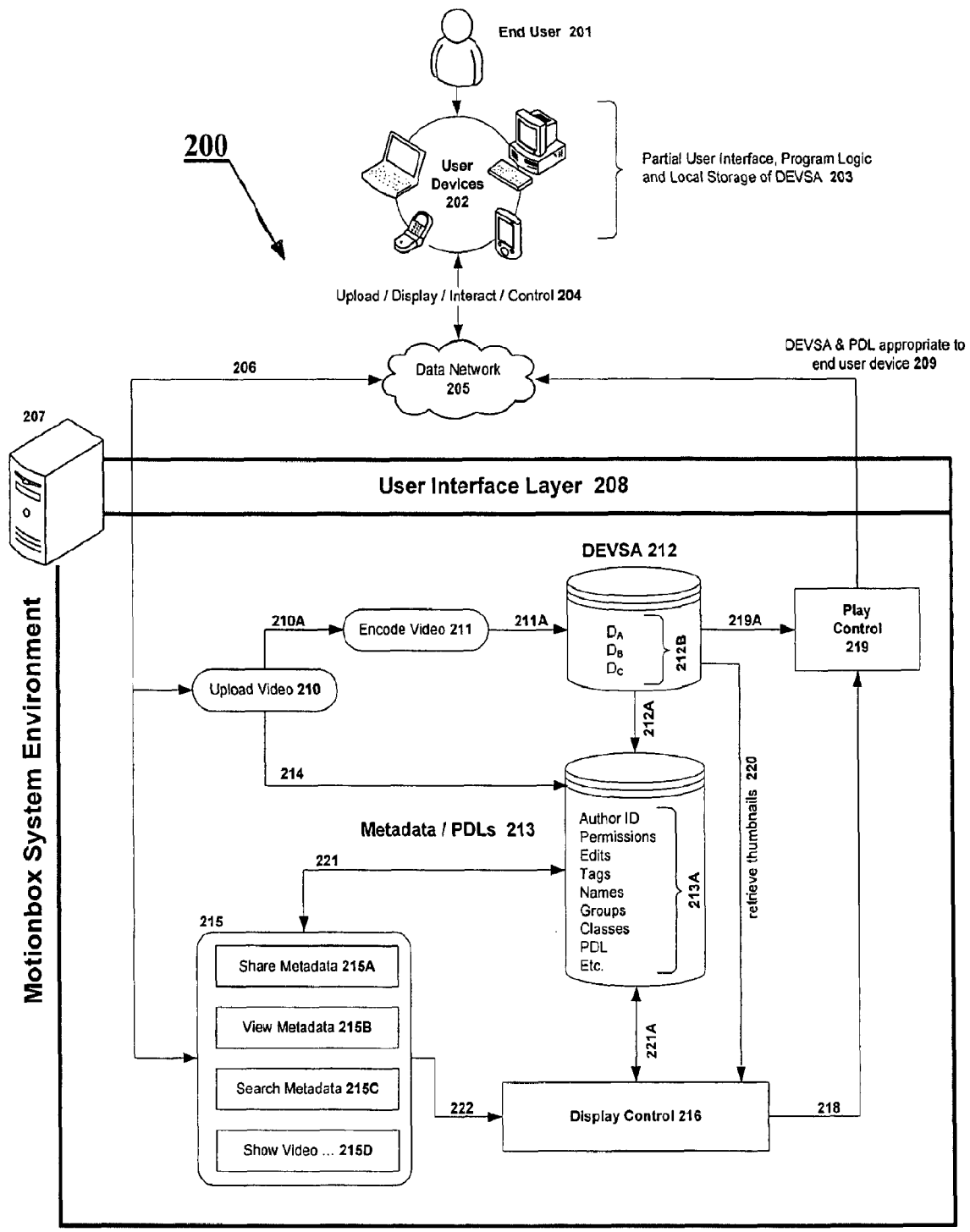
FIG. 2 represents an illustrative flow diagram of an interactive system and data model for shared viewing and editing of time-based media enabling a smooth interaction between a video media user and underlying stored DEVSA data.

Referring now to FIG. 2, in a manner similar to that discussed with FIG. 1, here an electronic system integrated user interface, programming module, and data model 200 describes the likely flows of information and control among various components noted therein. Again, as noted earlier, the term "video" is sometimes used below as a term of convenience and should be interpreted by those of skill in the art to mean DEVSA.

Here, an end user 201 may optionally employ a range of user device types 202 such as PCs, cell phones, iPods etc. which provide user 201 with the ability to perform multiple activities 204 including upload, display, interact, control, etc.

of video, audio and other data via some form of a data network 205 suited to the particular user device 202.

User devices 202, depending on their capabilities and interactions with the other components of the overall architecture for proper functioning, will provide local 203 portions of the user interface, program logic and local data storage, etc., as will also be discussed.

Other functions are performed within the proposed system environment 207 which typically operates on one or more servers at central locations while allowing for certain functionality to be distributed through the data network as technology allows and performance and economy suggest without changing the program or data model and processes as described herein.

As shown, interactions between system environment 207 and users 201 pass through a user interface layer 208 which provides functionality commonly found on Internet or cell phone host sites such as security, interaction with Web browsers, messaging etc. and analogous functions for other end user devices.

As noted earlier, users 201 may perform many functions; including video, audio and other data uploading DEVSA from user device 202 via data network 205 into system environment 207 via data path 206.

An upload video module 210 provides program logic that manages the upload process, which can take a range of forms. For video from a cell phone, the upload process may be via emailing a file via user interface 208 and data network 205. For video captured by a video camera, the video can be transferred from a camera to a user's PC and then uploaded from the PC to system environment 207 via the Internet in real time or as a background process or as a file transfer. Physical transmission of media is also possible.

During operation of system 200, and after successful upload, each video is associated with a particular user 201, assigned a unique identifier, and other identifiers, and passed via path 210A to an encode video process module 211 where it is encoded into one or more standard DEVSA forms as determined by a system administrators (not shown) or in response to a particular user's requests. The encoded video data then passes via pathway 211A to storage in DEVSA storage files 212.

Within DEVSA files in storage 212, multiple ways of encoding a particular video data stream are enabled; by way of example only, three distinct ways 212B, labeled $D_A$, $D_B$, $D_C$, are represented. There is no significance to the use of three as an example other than to illustrate that there are various forms of DEVSA encoding and to illustrate this diversity system 200 enables adaptation to any particular format desired by a user and/or specified by system administrators.

One or more of the multiple distinct methods of encoding may be chosen for a variety of reasons. Some examples are distinct encoding formats to support distinct kinds of end user devices (e.g., cell phones vs. PCs), encoding to enhance performance for higher and lower speed data transmission, encoding to support larger or smaller display devices. Other rationales known for differing encodation forms are possible, and again would not affect the processes or system and model 200 described herein. A critical point is that the three DEVSA files 212B labeled $D_A$, $D_B$, $D_C$ are encodings of the same video and synchronized audio using differing encodation structures. As a result, it is possible to store multiple forms of the same DEVSA file in differing formats each with a single encodation process via encodation video 211.

Consequent to the upload, encode, store processes a plurality of metadata 213A is created about that particular DEVSA data stream being uploaded and encoded; including user ID, video ID, timing information, encoding information, including the number and types of encodings, access information etc. which passes by paths 214 and 212A respectively to the Metadata/PDL (playback decision list) storage facilities 213. Such metadata will be used repeatedly and in a variety of combinations with other information to manage and display the DEVSA combined with the metadata and other information to meet a range of user requirements.

Thus, as with the earlier embodiment shown in FIG. 1, those of skill in the art will recognize that the present invention enables a single encodation (or more if desired) but many metadata details about how the encoded DEVSA media is to be displayed, managed, parsed, and otherwise processed.

It is expected that many users and others including system administrators (not shown) will upload many videos to system environment 207 so that a large library of DEVSA and associated metadata will be created by the process described above.

Following the same data path 206, users 201 may employ a variety of program logic functions 215 which use, create, store, search, and interact with the metadata in a variety of ways a few of which are listed as examples including share metadata 215A, view metadata 215B, search metadata 215C, show video 215D etc. These data interactions utilize data path 221 to the Metadata/PDL databases 213. A major functional portion of the metadata is Playback Decision Lists (PDLs) which are additionally described in detailed in other, parallel submissions, each incorporated fully by reference herein. PDLs, along with other metadata, control how the DEVSA is played back to users and may be employed in various settings.

As was shown in FIG. 2 many of the other functions in program logic box 215 are targeted at online and interactive display of video and other information via data networks. As was also shown in FIG. 1, but not indicated here, similar combinations of metadata and DEVSA can be used to create permanent media.

Thus, those of skill in the art will recognize that the present disclosure also enables a business method for operating a user interface 208.

It is the wide variety of metadata, including PDLs, created and then stored which controls the playback of video, not a manipulation of the underlying and encoded DEVSA data.

In general the metadata will not be dependent on the type of end user device utilized for video upload or display although such dependence is not excluded from the present disclosure.

The metadata does not need to incorporate knowledge of the encoded DEVSA data other than its identifiers, its length in clock time, its particular encodings, knowledge of who is allowed to see it, edit it, comment on it, etc. No knowledge of the actual images or sounds contained within the DEVSA is required to be included in the metadata for these processes to work. While this point is of particular novelty, this enabling system 200 is more fully illustrative.

Such knowledge of the actual images or sounds contained within the DEVSA while not necessary for the operation of the current system enables enhanced functionalities. Those with skill in the art will recognize that such additional knowledge is readily obtained by means of techniques including voice recognition, image and face recognition as well as similar technologies. The new results of those technologies can provide additional knowledge, which can then be integrated with the range of metadata discussed previously to provide enhanced information to users within the context of the present invention. The fact that this new form of information was derived from the contents of the time-based media does not imply that the varied edit, playback and other media manipulation techniques discussed previously required any decoding and re-encoding of the DEVSA. Such knowledge of the internal contents of the time-based media can be obtained by decoding with no need to re-encode the original video so the basic premises are not compromised.

User displays are generated by functions 215 via path 222 to display control 216 which merges additional metadata via path 221A, thumbnails (still images derived from videos) from DEVSA storage 212 via pathway 220. (Note that the thumbnail images are not part of the metadata but are derived directly from the DEVSA during the encoding process 211 and/or as real-time process acting on the DEVSA without modifying the DEVSA triggered by one of the functions 215 or by some other process. Logically the thumbnails are part of the DEVSA, not part of the metadata stored at 213, but alternative physical storage arrangements are envisioned herein without departing from the scope and spirit of the present invention.

An output of display control 216 passes via pathways 218 to play controller 219, which merges the actual DEVSA from storage 212 via data path 219A and sends the information to the data network via 209. Since various end user devices have distinct requirements, multiple play control modules may be implemented in parallel to serve distinct device types and enhance overall response to user requests for services.

Depending on the specific end user device to receive the DEVSA, the data network it is to traverse and other potential decision factors such as the availability of remote storage, at playback time distinct play control modules will utilize distinct DEVSA such as files $D_A$, $D_B$, or $D_C$ via 219A.

The metadata transmitted from display control 216 via 218 to play control 219 includes instructions to play control 219 regarding how it should actually play the stored DEVSA data and which encoding to use.

The following is a sample of a PDL—playback decision list—and a tracking of user decisions in metadata on how to display the DEVSA data. Note that two distinct videos (for example) are included here to be played as if they were one. A simple example of typical instructions might be:
Instruction:
  Play video 174569, encoding b, time 23 to 47 seconds after start:
    Fade in for first 2 seconds—personal decision made for tracking as metadata on PDL.
    Increase contrast throughout—personal decision made for PDL.
    Fade out last 2 seconds—personal decision made for PDL.
  Play video 174569, encoding b, time 96 to 144 seconds after start
    Fade in for first 2 seconds—personal decision made for PDL.
    Increase brightness throughout—personal decision made for PDL.
    Fade out last 2 seconds—personal decision made for PDL.
  Play video 174573 (a different video), encoding b, time 45 to 74 seconds after start
    Fade in for first 2 seconds—personal decision for PDL.
    Enhance color AND reduce brightness throughout, personal decision for PDL.
    Fade out last 2 seconds—personal decision for PDL.

The playback decision list (PDLs) instructions are those selected using the program logic functions 215 by users who are typically, but not always, the originator of the video. Note that the videos may have been played "as one" and then have had applied changes (PDLs in metadata) to the visual video impression and unwanted video pieces eliminated. Nonetheless the encoded DEVSA has not been changed or overwritten, thereby minimizing risk of corruption, the expense of re-encoding has been avoided and a quick review and co-sharing of the same video and audio among video editors has been enabled.

Much other data may be displayed to the user along with the DEVSA including metadata such as the name of the originator, the name of the video, the groups the user belongs to, the various categories the originator and others believe the video might fall into, comments made on the video as a whole or on just parts of the video, tags or labels on the video or parts of the video.

It is important to note that the interactive functions 215 for reviewing and using DEVSA data, do not link to the DEVSA files, only to the metadata files, it is the metadata files that back link to the DEVSA data. Thus, display control function 216 links to DEVSA files at 212 only to retrieve still images. A major purpose of this data architecture and data system 200 imagines that the DEVSA, once encoded via encodation module 211, is not manipulated or changed and hence speed and video quality are increased, computing and storage costs are reduced. All interactive capabilities are applied at the time of play control that is a read-only process on the DEVSA.

Those of skill in the art should recognize that in optional modes of the above invention each operative user may share their metadata with others, create new metadata, or re-use previously stored metadata for a particular encoded video.

Those of skill in the art will similarly recognize that when a user creates a permanent media version 117, playback decision lists (PDLs) or playback decision preferences, may optionally evolve into very-broadly described edit decision lists (EDL's) or viewing instructions that are fixed in form and become for example, a table of contents, an index, or other operative instructions on a fixed media version of the time-based media (for example a DVD).

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. An electronic system, for manipulation of time-based media by at least one user, said electronic system, comprising:
  at least one user computerized electronic memory device enabling a manipulation of said time-based media;
  user interface means for enabling at least a transmission of said time-based media from said computerized electronic memory device to means for encoding and for storing said encoded time-based media in at least an initial encoded state within an electronic system environment;
  metadata system means for creating, storing, and managing a plurality of layers of metadata each in a manner associated with said initial encoded state of said encoded time-based media without modifying said initial encoded state of said encoded time-based media;

electronic interaction system means for interacting with said metadata system means for creating, storing and managing to enable said at least one user to modify said metadata associated with said initial encoded state of said time-based media to establish at least one stored user playback decision list preference; and said electronic interaction system means including means for enabling a display of said encoded time-based media according to said at least one stored user playback decision list preference, thereby enabling a modified display of said encoded time-based media without modifying said initial encoded state of said encoded time-based media.

2. An electronic system, for manipulation of time-based media by at least one user, according to claim 1, wherein:

said electronic interaction system means enables said at least one user to modify said metadata associated with said initial encoded state of said time-based media in a plurality of user playback decision list preferences, involving at least one user playback decision list selection selected from a group comprising:

a display control selection, a play control selection, an editing selection, a virtual browsing selection, a commenting to a social browsing selection, a creation of permanent media selection, a sharing of metadata selection, a viewing of metadata selection, and a searching of metadata, whereby said electronic system enables said user to create at least one of said plurality of layers of metadata according to said user's preference.

3. An electronic system, for manipulation of time-based media by at least one user, according to claim 1, wherein:

said metadata system means for creating, storing, and managing a plurality of layers of metadata includes at least one type of metadata selected from a group of metadata comprising:

user identification metadata, time-based media identification metadata, timing information metadata, encoding information metadata including the number and types of encoding, user access information metadata, user groups' metadata, user classes' metadata, use playback decision list preference metadata, display control preference information metadata, play control preference information metadata, and permanent media interaction metadata.

4. An electronic system, for manipulation of time-based media by at least one user, according to claim 1, wherein:

said means for encoding and for storing further comprises:

means for encoding and for storing said time-based media in a plurality of encoded states within said electronic system environment; and said metadata system means for creating, storing, and managing a plurality of layers of metadata, further comprises:

means for creating, storing, and managing a plurality of layers of metadata separately associated with each respective one of said plurality of encoded states within said electronic system, whereby said electronic system readily adapts to a diversity of time-based media.

5. An electronic system, for manipulation of time-based media by at least one user, said electronic system, comprising:

at least one user computerized electronic memory device enabling a manipulation of said time-based media;

user interface means for transmitting said time-based media from said computerized electronic memory device to means for encoding and storing said time-based media in at least a first initial encoded state in a networked electronic system environment;

metadata system means for creating, storing, and managing a plurality of layers of metadata each in a manner associated with said initial encoded state of said encoded time-based media without modifying said initial encoded state of said encoded time-based media;

electronic interaction system means for interacting with said metadata system means for creating, storing, and managing to enable said at least one user to modify said metadata according to at least one user-modification preference; and said electronic interaction system means including means for enabling a display of said encoded time-based media according to said at least one user-modification preference, thereby enabling a modified display of said encoded time-based media without modifying said initial encoded state.

6. An electronic system, according to claim 5, wherein:

said user interface means further includes means for assigning a unique identifier to each said transmission of said time-based media; and each said unique identifier includes at least one identifier selected from a group consisting of:

a user identifier, a transmission identifier, a user encodation standard identifier, a system administrator encodation standard, and a time-based media identifier.

7. An electronic data system, for shared viewing of time-based media by at least one user, the electronic data system comprising:

at least one user computerized electronic device enabling a manipulation of said time-based media;

a user electronic interface layer for enabling a plurality of activities between said user computerized electronic device and a connected electronic system environment;

at least one of said plurality of activities including transmitting and receiving electronic communications of said time-based media between said user computerized electronic device and a connected electronic system environment;

an encoding system for receiving said time-based media and for encoding said time-based media in at least a first encoding standard; a metadata system for establishing metadata associated with said time-based media encoded in said at least first encoding standard; means for storing said encoded time-based media and said metadata associated with said encoded time-based media;

an electronic interaction system enabling said at least one user to modify said metadata associated with said encoded time-based media in at least a first stored playback decision list via a communication path including said user computerized electronic device and said electronic interface layer, whereby said user stored first playback decision list modifies said metadata without modifying said encoded time-based media in said first encoded standard; and said electronic interaction system includes a display control system and a play control system enabling said user to display and play said encoded time-based media according to said metadata modified according to said at least one playback decision list.

8. An electronic data system, according to claim 7, wherein:
said plurality of activities enabled by said user electronic interface layer includes at least one activity selected from a group consisting of:
an upload of said time-based media, a transmission of said encoded time-based media in said first encoded standard, a transmission of said metadata in said modified state according to said at least one stored playback decision list, a transmission of said encoded time-based media in combination with said metadata in said modified state, whereby said user receives an improved interaction with said time-based media.

9. An electronic data system, according to claim 7, wherein:
said electronic interaction system enabling said modification of said metadata, whereby said modification includes at least one of a group comprising: editing, changing permissions data, virtual browsing, tagging, commenting, social browsing, and creation of a permanent media form; and
said permanent media form including at least one of said time-based media in said first encoded standard and metadata associated with said encoded time-based media modified according to said at least one stored playback decision list.

10. An electronic data system, according to claim 9, wherein:
said electronic interaction system further comprises:
a transmission module;
said transmission module including at least one of a permanent media production system for producing said permanent media, a business system for processing a charge for said production of said permanent media, and a shipping system for shipping said permanent media as determined by said user.

11. An electronic data system, according to claim 10, wherein:
said electronic interaction system enables a searching of said metadata associated with said time-based media, whereby said searching is faster than a searching of said encoded time-based media alone.

12. An electronic data system, according to claim 7, wherein:
said metadata associated with said time-based media includes a plurality of data including at least one of group consisting of: author data, permission data, tagging data, grouping data, classes data, commenting data, and naming data, whereby said established metadata and said electronic interaction system enables said electronic data system to differentiate a plurality of stored playback decision lists based on said metadata.

13. An electronic data system, according to claim 12, wherein:
said electronic interaction system enables a viewing of said metadata associated with said time-based media in said stored playback decision lists, whereby said electronic data system enables an enhanced viewing of said time-based media.

14. An electronic data system, according to claim 12, wherein:
said electronic interaction system enables a sharing of said metadata associated with said time-based media to an external user, whereby said electronic data system enables an enhanced sharing of said time-based media.

15. An electronic data system, according to claim 12, wherein:
said electronic interaction system enables a showing of said metadata associated with said time-based media to an external user, whereby said electronic data system enhances a showing of said time-based media.

16. An electronic data system, according to claim 7, wherein:
said electronic interaction system and said metadata creation system enable at least a second stored playback decision list that modifies said stored metadata in a second manner without modifying said encoded time-based media in said first encoded standard and without modifying said first stored playback decision list; and
whereby said electronic data system enables a generation of a plurality of playback decision lists that enable a plurality of distinct playbacks of said encoded time-based media without a re-encoding of said encoded time-based media, thereby minimizing a storage space for said encoded time-based media.

17. An electronic data system, for shared viewing of time-based media by a plurality of users including at least one user, the electronic data system comprising:
at least one user computerized electronic device enabling an initial manipulation of said time-based media;
a user electronic interface layer for enabling a plurality of activities between said user computerized electronic device and a connected electronic system environment;
at least one of said plurality of activities including transmitting and receiving electronic communications of said time-based media between said user computerized electronic device and a connected electronic system environment;
an encoding system for receiving said time-based media and for encoding said time-based media in a first encoding standard; a metadata creating system for establishing metadata associated with said time-based media;
storage system means for storing said encoded time-based media in said first encoded standard and for storing said metadata associated with said encoded time-based media; and
an electronic interaction system enabling said at least one user to modify said metadata associated with said encoded time-based media incorporating at least a first stored playback decision list via a communication path including said user computerized electronic device and said electronic interface layer, whereby said user interaction stored playback decision list modifies said metadata without modifying said encoded time-based media in said first encoded standard, whereby an electronic storage memory need is minimized.

18. An electronic data system, according to claim 17, wherein:
said electronic interaction system further comprises: a display control system and a play control system enabling at least one of said plurality of users to display and play said encoded time-based media according to said metadata as at least first stored playback decision list.

19. An electronic data system, according to claim 18, wherein:
said plurality of activities enabled by said user electronic interface layer includes at least one selected from a group consisting of:
an upload of said time-based media, a transmission of at least part of said encoded time-based media in said first encoding standard, and a transmission of said encoded time-based media according to said metadata and said at least one stored playback decision list, whereby said user receives an enhanced interaction with said time-based media; and said electronic interaction system enables said modification, whereby said modification includes at least one modification selected from a group consisting of:

editing, virtual browsing, tagging, commenting, social browsing, and creation of a permanent media form.

20. An electronic data system, according to claim 19, wherein:

said permanent media form includes at least one of said time-based media in said first encoded standard and metadata associated with said encoded time-based media modified according to said at least one stored playback decision list.

21. An electronic data system, according to claim 17, wherein:

said electronic interaction system enables at least one of a viewing, a sharing, a searching, and a showing of said metadata associated with said stored encoded time-based media by said at least one user without modifying said time-based media from said first encoding standard.

22. An electronic data system, according to claim 21, wherein said electronic interaction system further comprises:

a transmission module for transmitting said permanent media; and said transmission module including at least one of a permanent media production system for producing said permanent media, a business system for processing a charge for said production of said permanent media, and a shipping system for shipping said permanent media as determined by said user.

23. A method for shared viewing and editing of time-based media, comprising the steps of:

uploading time-based media from at least one user computerized electronic device;

providing a user electronic interface layer for enabling a plurality of activities between said user computerized electronic device and a connected electronic system environment;

at least one of said plurality of activities including transmitting and receiving electronic communications of said time-based media between said user computerized electronic device and an electronic system environment;

providing an encoding system for receiving said time-based media and for encoding said time-based media in at least a first encoding standard;

providing a metadata system for establishing metadata associated with said time-based media;

providing a storage system for storing said encoded time-based media in said first encoding standard and metadata associated with said encoded time-based media;

operating an electronic interaction system enabling at least one user modification of said metadata, associated with said encoded time-based media, in at least a first stored playback decision list via a communication path including said user computerized electronic device and said electronic interface layer, whereby said user interaction stored playback decision list modifies said metadata without modifying said encoded time-based media in said first encoded standard and enables said shared viewing and said editing.

24. A method for shared viewing and editing of time-based media, according to claim 23, wherein:

said step of operating said electronic interaction system, further comprising the step of:

providing a control system and a play control system enabling said user to display and play said encoded time-based media according to said modified metadata according to said at least one playback decision list, whereby said method enables said shared viewing and editing.

25. An electronic data system for enabling shared viewing and improved editing of time-based media, comprising:

means for receiving user uploaded time-based media in an operational environment including a computer memory;

encoding means for encoding said time-based media in an initial state;

storing memory means for storing said encoded time-based media in said initial state in said computer memory;

a metadata system for establishing metadata associated with said time-based media during said encoding by said encoding system separately from said initial state in said computer memory;

means for at least one of an editing, a virtual browsing, a tagging, a commenting, a social browsing, and a logical manipulation of said metadata and for storing said at least one in at least a first stored playback decision list relating to said at least one; and means for interacting with said metadata and said at least first stored playback decision list, whereby said means for interacting enables driving both a display control system and play control system to display said encoded time-based media according to said at least first stored playback decision list without changing said encoded time-based media from said initial state.

26. An electronic data system, according to claim 25, wherein:

said means for interacting includes means for at least one selected from a group consisting of:

an editing, a virtual browsing, a tagging, a commenting, a social browsing, and a creation of a permanent media form; and said permanent media form including at least one of said time-based media in said first encoded standard and metadata associated with said encoded time-based media modified according to said at least one stored playback decision list.

27. An electronic data system, according to claim 26, wherein:

said means for interacting further comprises:

a transmission module for transmitting said permanent media; and said transmission module including at least one of a permanent media production system for producing said permanent media, a business system for processing a charge for said production of said permanent media, and a shipping system for transmitting said permanent media as determined by said user.

* * * * *